(12) United States Patent
Marash et al.

(10) Patent No.: US 8,942,386 B2
(45) Date of Patent: Jan. 27, 2015

(54) REAL-TIME QUALITY MONITORING OF SPEECH AND AUDIO SIGNALS IN NOISY REVERBERANT ENVIRONMENTS FOR TELECONFERENCING SYSTEMS

(75) Inventors: Joseph Marash, Irvine, CA (US); Baruch Berdugo, Kiriat Ata (IL)

(73) Assignee: Midas Technology, Inc., Burbank, CA (US)

( * ) Notice: Subject to any disclaimer, the term of this patent is extended or adjusted under 35 U.S.C. 154(b) by 474 days.

(21) Appl. No.: 13/307,320

(22) Filed: Nov. 30, 2011

(65) Prior Publication Data

US 2013/0136273 A1 May 30, 2013

(51) Int. Cl.
*H04R 3/00* (2006.01)

(52) U.S. Cl.
USPC .............................. 381/92; 704/233

(58) Field of Classification Search
USPC .................. 381/26, 56, 57, 83, 91, 92, 93, 381/94.1–94.3, 94.5, 111, 122, 123, 312, 381/313, 356, 357; 704/226, 233, 270, 704/270.1
See application file for complete search history.

(56) References Cited

U.S. PATENT DOCUMENTS

| 7,116,791 | B2 | 10/2006 | Matsuo |
| 7,643,641 | B2 | 1/2010 | Haulick |
| 2007/0147625 | A1 | 6/2007 | Shields |
| 2007/0160242 | A1 | 7/2007 | Cadalli |
| 2010/0142732 | A1 | 6/2010 | Craven |
| 2011/0093273 | A1 | 4/2011 | Lee |

OTHER PUBLICATIONS

International Search Report for International Application No. PCT/US2012/067199 mailed Feb. 6, 2013.
"Adaptive Beamforming and Postfiltering", Springer Handbook of Speech Processing, Benesty, J. et al. eds., 2008, Chapter 47, pp. 945-978, Springer.
Albertin, E. et al., "Objective Quality Measures for Dereverberation Methods based on Room Impulse Response Equalization", Fraunhofer Institute for Digital Media Technology, Project group Hearing, Speech, and Audio Technology, 26129 Oldenburg, 36th German Annual Conference on Acoustics, Mar. 2010.
Cohen et al., "Speech Processing in Modern Communication: Challenges and Perspectives", 2009, Springer.

(Continued)

*Primary Examiner* — Paul S Kim
*Assistant Examiner* — Friedrich W Fahnert
(74) *Attorney, Agent, or Firm* — Pearl Cohen Zedek Latzer Baratz LLP

(57) ABSTRACT

A method for real-time monitoring of audio signals reception quality includes receiving output signals from a plurality of microphone clusters, each microphone cluster having at least two microphone units to receive audio signals from at least two distinct directions and output corresponding electrical signals; identifying comparative features of output signals for each of the microphone clusters; and selecting at least one microphone cluster based on the identified features. A system for real-time monitoring of audio signals reception quality includes a plurality of microphone clusters, each microphone cluster having at least two microphone units to receive audio signals from at least two distinct directions and output corresponding electrical signals; and a main audio unit to identify comparative features of output signals for each of the microphone clusters and to select at least one microphone cluster based on the identified features.

16 Claims, 2 Drawing Sheets

(56) References Cited

OTHER PUBLICATIONS

Falk, T. et al, "A Non-Intrusive Quality and Intelligibility Measure of Reverberant and Dereverberated Speech", IEEE Transactions on Audio, Speech, and Language Processing, vol. 18, No. 7, Sep. 2010, pp. 1766-1774.

Goetze, S. et al., "Quality Assessment for Listening-Room Compensation Algorithms", IEEE International Conference on Acoustics, Speech & Signal Processing, 2010, pp. 2450-2453.

Gover, B. et al., "Microphone array measurement system for analysis of directional and spatial variations of sound fields", J. Accoust. Soc. Am., vol. 112, No. 5, Pt. 1, Nov. 2002, pp. 1980-1991.

Gray, A. et al., "Distance Measures for Speech Processing", IEEE Transactions on Acoustics, Speech, and Signal Processing, vol. ASSP-24, No. 5, Oct. 1976, pp. 380-391.

Huber, R. et al., "PEMO-Q—A New Method for Objective Audio Quality Assessment Using a Model of Auditory Perception", IEEE Transactions on Audio, Speech, and Language Processing, vol. 14, No. 6, Nov. 2006, pp. 1902-1911.

Habets, E. et al., "Speech Dereverberation Using Backward Estimation of the Late Reverberant Spectral Variance", IEEE 25$^{th}$ Convention of Electrical and Electronic Engineers in Israel, Dec. 2008, pp. 384-388.

Naylor, P. et al, "Signal-Based Performance Evaluation of Dereverberation Algorithms", Journal of Electrical and Computer Engineering, 2010, pp. 1-5, vol. 2010, Hindawi Publishing Corporation.

Cohen et al., "Speech enhancement for non-stationary noise environments", Signal Processing vol. 81, 2001, pp. 2403-2418.

"Spectral Enhancement Methods", Springer Handbook of Speech Processing, Benesty, J. et al. eds., 2008, Chapter 44, pp. 873-901, Springer.

Habets, E. et al, "Late Reverberant Spectral Variance Estimation Based on a Statistical Model", IEEE Signal Processing Letters, vol. 16, No. 9, Sep. 2009, pp. 770-773.

Wang, S. et al., "An Objective Measure for Predicting Subjective Quality of Speech Coders", IEEE Journal on Selected Areas in Communications, vol. 10, No. 5, Jun. 1992, pp. 819-829.

Wen, J. et al., "Evaluation of speech dereverberation algorithms using the Mardy database", Proceedings of the International Workshop on Acoustic Echo and Noise Control, Paris, France, Sep. 2006.

REAL-TIME QUALITY MONITORING OF SPEECH AND AUDIO SIGNALS IN NOISY REVERBERANT ENVIRONMENTS FOR TELECONFERENCING SYSTEMS

FIELD OF THE INVENTION

The present invention relates to the field of real-time quality monitoring of received audio and speech signals in a teleconferencing system. More specifically, the present invention relates to real-time dynamic selection of microphone units as system output sources based on reception quality in the microphone units.

BACKGROUND OF THE INVENTION

Some teleconferencing systems use a plurality of microphone units or clusters distributed over a room. The audio reception quality of the microphone units may be monitored in order to select the microphone units or clusters that receive the source signal with the best quality. The system may use the output from a selected microphone unit or cluster, or may mix the outputs of several selected microphone units or clusters and use it as the system output.

There are various selection methods that use different parameters such as the received signal strength and the signal to noise ratio (SNR) and different algorithms for determining which microphone unit has the best quality. Since the level of reverberation may significantly affect the intelligibility of speech, some selection methods try to estimate the level of reverberation received by a microphone unit and to use it as parameter for selection. In some known methods, the level of reverberation is estimated according to the signal power or the SNR, for example based on the assumptions that the level of noise is uniform, the level of reverberation is uniform across the room and that all the microphone units have the same sensitivity, i.e., the same proportion between the acoustic pressure on the microphone unit and its output signal. Based on these assumptions, for example, the signal with the maximal received power may be considered as the least reverberant signal. However, this is not always the case, and often some areas in the room are significantly more reverberant than other areas, and the sensitivity of the microphone units often varies from unit to unit.

Some more sophisticated known methods for estimating the reverberation levels usually are not suitable for real-time monitoring or are not suitable for speech signals, and therefore may not be suitable for teleconferencing systems. For example, some of these methods require signal segments that are too long for real-time monitoring or require a normalized and/or spectrally white source signal. Some other methods use complicated and expensive devices and analyses that may be suitable for a unique measurement for evaluating the directional distribution of arriving energy and the degree and diffuseness of sound fields in a given room, but that may not be suitable for a constantly changing environment and audio sources and/or for dynamic real time reverberation measurements.

SUMMARY OF THE INVENTION

The present invention provides a method and system for real-time monitoring of audio signals reception quality. The method according to embodiments of the present invention may include receiving output signals from a plurality of microphone clusters. Each microphone cluster may have at least two microphone units to receive audio signals from at least two distinct directions and to output corresponding electrical signals. In some embodiments, the at least two microphone units in each microphone cluster are aimed in opposite directions. In some embodiments, each microphone cluster may include four perpendicular microphone units.

Additionally, the method according to embodiments of the present invention may include identifying comparative features of output signals for each of the microphone clusters and selecting at least one microphone cluster based on the identified features. Identifying comparative features according to embodiments of the invention may include measuring power levels of signals sensed by at least two microphone units in each microphone cluster, finding the maximal received signal power in each cluster and computing power ratio of each cluster, wherein the power ratio is the ratio between the maximal and minimal received signal powers in the cluster at a certain time.

Measuring of power levels according to embodiments of the present invention may be performed by sampling and smoothing the power levels over a certain time interval. The time intervals over which the power levels may be smoothed may be larger when the sampled power level decreases than when the power level increases.

The selection of a microphone cluster according to embodiments of the invention may be based on the computed power ratios. The selection may include, for example, selecting the microphone cluster(s) with the highest power ratio(s). The selection may be from among candidate microphone clusters that were selected according to maximal received signal power in each cluster. For example, the microphone cluster with the highest maximal received signal power may be found and then, the microphone clusters that have maximal received signal power in a predetermined range from the highest maximal received signal power may be selected as candidate microphone clusters. According to embodiments of the present invention, the selection may be performed, for example, when the highest maximal received signal power is in upward trend.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE INVENTION

In the following detailed description, numerous specific details are set forth in order to provide a thorough understanding of the invention. However, it will be understood by those skilled in the art that the present invention may be practiced without these specific details. In other instances, well-known methods, procedures and components have not been described in detail so as not to obscure the present invention.

Embodiments of the present invention may provide a method for selecting from a plurality of microphone clusters distributed in a room a microphone cluster that senses the smallest amount of reverberation and for estimating the reverberation level sensed at a microphone cluster at a given time in an economical and practical manner for real-time dynamic monitoring.

Figure 1:
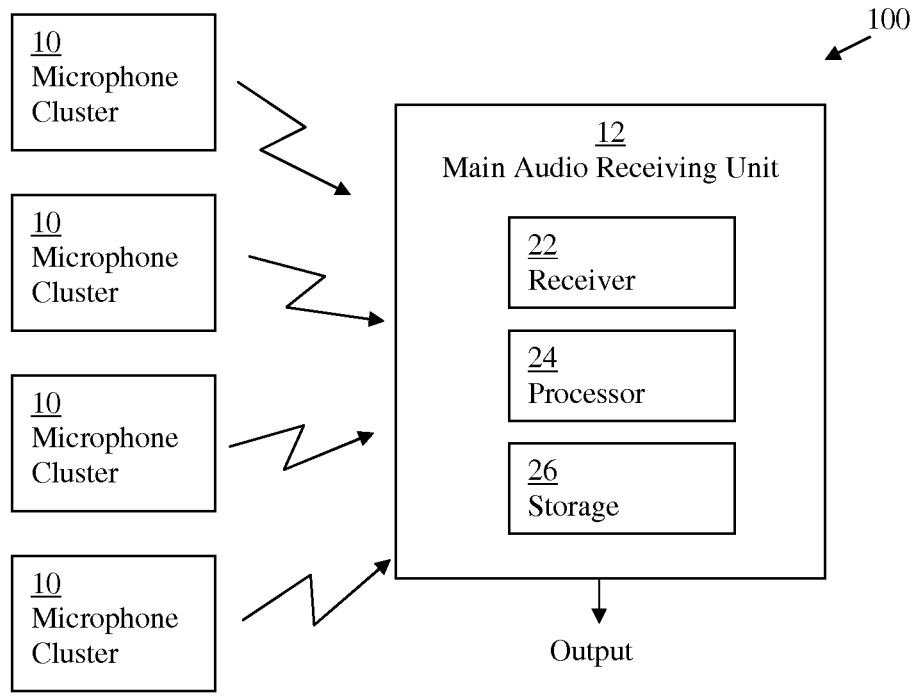
FIG. 1 is a schematic illustration of a system for real-time monitoring of audio signals reception quality according to embodiments of the present invention.

Reference is now made to FIG. 1, which is a schematic illustration of a system 100 for real-time monitoring of audio signals reception quality according to embodiments of the present invention. System 100 may include microphone clusters 10 and a main audio receiving unit 12, which may include a processor 24 and a storage medium 26. Microphone clusters 10 may be distributed across a room or an area, for example, a room or area of a gathering, discussion or conference. Each of microphone clusters 10 may include a number of microphone units which may receive and/or sense audio signals and produce corresponding output electrical signal, as described herein with reference to FIGS. 2-4.

Microphone clusters 10 may receive source audio signals including speech audio signals from different sources across the room, such as, for example, different speakers in a discussion, and may output corresponding electrical signals. Main audio unit 12 may receive the output signals, identify features of the signals and select the microphone cluster or clusters with the best reception quality at a given time, for example based on the identified comparative features of the output signals received at each cluster, such as maximal power level and power ratio of each microphone cluster, for example according to methods provided by embodiments of the present invention and described herein. The output signal from the best receiving microphone cluster at a given time may be used as the output of system 100, or output signals from several best-receiving clusters may be mixed and a combination of the signals may be outputted as the output of system 100.

It will be appreciated that features of the received and/or sensed audio signals, such as power level, power ratio and/or spectral properties, may be identified and/or measured by main unit 12 based on the output signals of microphone clusters 10 and/or microphone units 14.

The processing and control operations of main audio receiving unit 12, as described herein, may be performed by processor 24. Processor 24 may be specially constructed for the desired purposes or may include general purpose computers selectively activated or reconfigured by a computer program stored in the computers, for example in storage device 26. Storage device 26 may be or include a non-transitory computer readable storage medium, such as, but not limited to, any type of disk including floppy disks, optical disks, CD-ROMs, magnetic-optical disks, read-only memories (ROMs), random access memories (RAMs) electrically programmable read-only memories (EPROMs), electrically erasable and programmable read only memories (EEPROMs), magnetic or optical cards, or any other type of media suitable for storing electronic instructions, and capable of being coupled to a computer system bus. According to embodiments of the present invention, storage device 26 may include an article such as a non-transitory computer or processor readable storage medium, such as, for example, a memory, a disk drive or a USB flash memory encoding, including or storing instructions, e.g., computer-executable instructions, which, when executed by processor 24, cause processor 24 to carry out methods disclosed herein. Additionally, the instructions may cause processor 24 to execute processes that carry out methods disclosed herein.

Unless specifically stated otherwise, as apparent from the following discussions, it is appreciated that throughout the specification discussions utilizing terms such as "processing", "computing", "storing", "determining", "selecting", "identifying", or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices.

Figure 2:
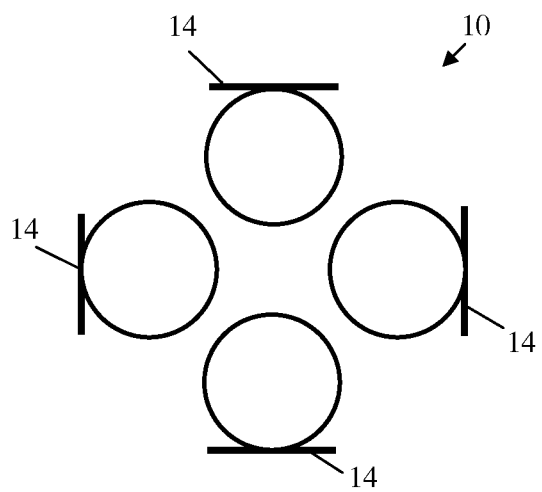
FIG. 2 is a schematic illustration of a microphone cluster according to embodiments of the present invention.

According to embodiments of the present invention, a plurality of microphone clusters 10 is distributed over an area, for example a conference room. Each of the microphone clusters should be able, according to embodiments of the present invention, to sense audio signals in a determined number of distinct directions in a certain location in the room. This arrangement may enable determination of the signal power as well as estimation of the reverberation level in each cluster location, for example, based on comparative features of signals received at each cluster by the microphone units. Reference is now made to FIG. 2, which is a schematic illustration of a microphone cluster 10 according to embodiments of the present invention. Microphone cluster 10 may include a number of microphone units 14. For example, microphone cluster 10 may include four unidirectional microphone units 14. Alternatively to unidirectional microphone units, a number of omni-directional microphone units may be used, which may produce unidirectional receiving beams by beamforming techniques, and thus produce unidirectional outputs. While FIG. 2 shows four unidirectional microphone units 14, it will be appreciated that the invention is not limited in this respect, and microphone cluster 10 may include a smaller number of unidirectional microphone units 14 or unidirectional beamformer outputs (although at least two microphone units may be required) at the expense of less accurate results, or a greater number of microphone units 14, at the expense of higher complexity and greater consumed computational power.

When a source in a room produces an audio source signal $S(t)$ in a room, a microphone cluster 10 located in this room may receive the signal after it passed in a direct path from the source, i.e., the direct path signal, as well as reflections of the signal from various objects and walls of the room, i.e., the reverberations. The overall effect of the room and microphone on the signal may be denoted by an impulse response function $h(t)$, such that a signal power measured at a microphone unit 14 at a given time t may be denoted by $S(t)h(t)+n(t)$, wherein $n(t)$ is the noise that may be produced from the various system components. The impulse response function may be divided into two components, early response $h^e(t)$ and late response $h^l(t)$, so that $h(t)=h^e(t)+h^l(t)$. The early response $h^e(t)$ represents the direct path from the source to the microphone output with the addition of early reflections, i.e., reflections with similar path length to the direct signal path, for example reflections that lag behind the direct-path signal by no more than approximately 50 ms. The late response $h^l(t)$ includes late reflections with substantially longer path than the direct path, i.e., the reverberations. Accordingly, the direct-to-reverberation ratio can be defined as the ratio between the substantially direct path signal power, i.e. $S(t)$ $h^e(t)$, and the reverberations power $S(t)$ $h^l(t)$.

According to embodiments of the present invention, the reception quality of a microphone unit 14 may be evaluated based on the direct-to-reverberation ratio. Microphone clusters 10 according to embodiments of the present invention may enable estimation of the direct-to-reverberation ratio at a certain location where the microphone cluster 10 is located. While the direct path signals are received in significantly different power levels at the different microphone units 14 of the same cluster 10, the reverberations power level is substantially similar in all microphone units 14 of the same cluster 10. Therefore, according to embodiments of the present invention, comparative features of the power levels measured at the different microphone units 14 of the same cluster 10 can be used for estimation of the direct-to-reverberations ratio. Such comparative features may include, for example, the local maximal power level and the power ratio, which is the ratio between the maximal power level received among microphone units 14 of the same cluster 10 at a given time and the minimal power level received among these microphone units 14 at the same time. In embodiments of the present invention, the power ratio of each cluster may be calculated and may enable estimation of the direct-to-reverberations ratio level, wherein a higher power ratio may indicate a higher direct-to-reverberation ratio.

As shown in FIG. 2, microphone units 14 of a certain cluster 10 may be arranged so that at least two microphone units 14 are aimed in opposite directions. For example, in case of four microphone units 14 in a cluster 10, the microphone units 14 may be arranged perpendicularly to each other. Usually, the minimal power level will be received at a microphone unit 14 located opposite to microphone unit 14 receiving the maximal power level in a certain cluster 10.

Figure 3:
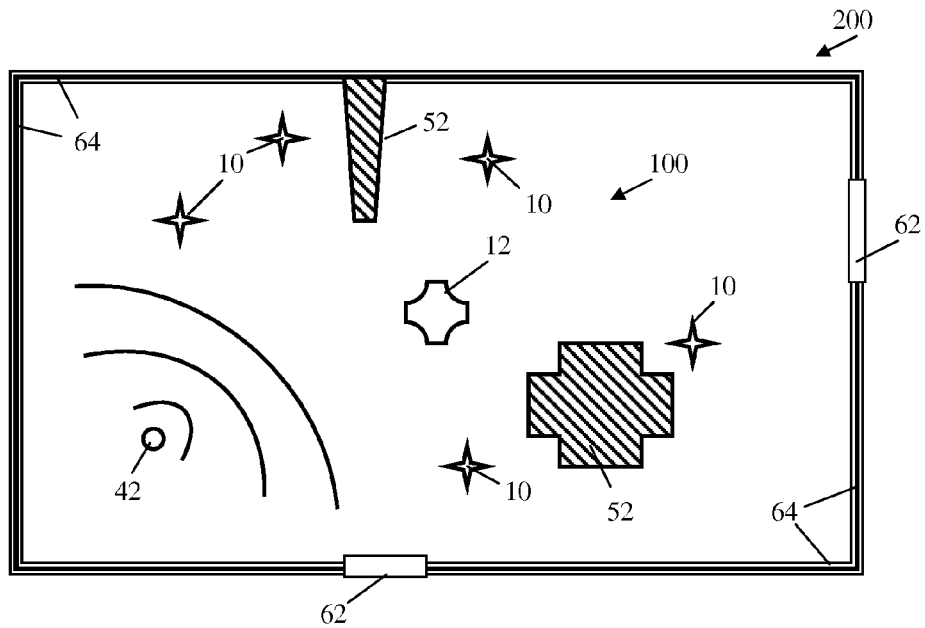
FIG. 3 is a schematic illustration of an exemplary distribution of system for real-time monitoring of audio signals reception quality in an exemplary room according to embodiments of the present invention.

Reference is now made to FIG. 3, which is a schematic illustration of an exemplary distribution of system 100 for real-time monitoring of audio signals reception quality in an exemplary room 200 according to embodiments of the present invention. For example, exemplary room 200 may include walls 64, openings 62 such as, for example, doors or windows, and may also include obstacles 52 such as tables, partitions, posts, etc. System 100, including microphone clusters 10 and main unit 12, may be distributed in room 200, for example randomly or evenly and/or in a certain manner suitable to room 200, for example based on the position of obstacles in the room. The exact contents and arrangement of room 200 may affect the quality of reception of an audio source signal at the plurality of clusters 10, which may be produced, for example, by a source 42, such as a speaking person. System 100 may include any number of clusters 10 suitable to room 200.

According to embodiments of the present invention, for each microphone cluster 10, microphone unit 14 that receives the maximal power level and/or the maximal power level received amongst microphone units 14 can be found and/or identified, and the power ratio can be calculated. As described above, in some embodiments, the minimal power level may be measured at a microphone unit 14 located opposite to microphone unit 14 in which the maximal power level is measured in a certain cluster 10. Therefore, in some embodiments of the present invention, the power ratio may be calculated by dividing the maximal measured power level by the power level received at a microphone unit 14 located opposite to microphone unit 14 receiving the maximal power level.

The identification of power level at each microphone unit 14 may be performed after processing of the received signal, for example for reduction of noise level and/or for enhancement of the speech intelligibility, for example by speech enhancement algorithm. Then, the power level in microphone units 14 may be identified, for example in a certain frequency band, for example a frequency band that covers the human speech and/or human hearing range, such as between 750 Hz and 4750 Hz. The power level may be sampled and smoothed over a certain time interval, for example in order to avoid excessive sensibility to arbitrary and/or momentary changes.

In some embodiments of the present inventions, at times when the measured power level is in upward trend, i.e., the derivative of the power level over time is positive, the measured power level can be smoothed over a short time interval, for example to enable quick tracking of power increases, such as at times of speech onsets. At times when the measured power level is in downward trend, i.e., the derivative of the power level over time is negative, the measured power level can be smoothed over a longer time interval, for example to avoid excess sensitivity to momentary decreasing tails of speech phonemes. For example, in case first order recursive smoothing is used for smoothing the measured power level, a small forgetting factor can be used when the power level increases and a larger forgetting factor can be used when the power level decreases.

According to embodiments of the present invention, at least one of microphone clusters 10 may be selected for audio output reception, according to the received power level, which should be sufficiently high, and according to the reverberations level, which should be as low as possible. The least reverberant received signal among microphone clusters 10 may be found based on the local maximal power level within each microphone cluster 10 and based on the power ratio in each microphone cluster and thus, for example, the microphone cluster 10 that receives the least reverberant signal may be identified. At each microphone cluster 10, the measured signal considered as the least reverberant signal is the local maximal power level signal, i.e., the highest power level measured signal among microphone units 14 of the cluster at a certain time. In order to find the least reverberant signal among clusters 10 and/or to determine which of microphone clusters 10 receives the global least reverberant signal, the power ratio of each microphone cluster 10 may be calculated. Then, the highest power ratio and/or microphone cluster 10 with the highest power ratio may be selected for output reception by main unit 12, for example from among candidate microphone clusters 10 that receive sufficiently high power signal.

The candidate microphone clusters 10 can be selected by finding the global maximal power level, i.e., the highest local maximal power level. The candidate microphone clusters 10 may then be selected, for example, based on a predetermined range from the global maximal power level. For example, the candidate microphone clusters 10 may be selected by identifying and/or selecting microphone clusters 10 with local maximal power level that is above a threshold and, for example, the threshold may be determined based on the global maximal power level. For example, the threshold may be determined to be a certain fraction from the global maximal power level. For example, the candidate microphone clusters may be selected by identifying and/or selecting microphone clusters 10 with local maximal power level that is greater than 80 percent of the global maximal power level, or 60 percent, or 90 percent, or any other suitable fraction that may be determined according to the case. In some cases, no threshold may be determined and, for example, all microphone clusters 10 may be candidate microphone clusters. In some other cases, a threshold of power level may be determined, and all microphone clusters 10 in which the measured local maximal power level exceeds the threshold may be selected as candidate microphone clusters. In some cases, a maximal number of candidate microphone clusters may be determined, so that, in case the number of candidate microphone clusters 10 is higher than the determined maximal number, only the determined maximal number of candidate microphone clusters is selected, for example the candidate microphone clusters that receive the highest power level signals.

The selection of candidate microphone clusters 10 may be restricted to be performed at times when the global maximal power increases, because power level increases usually correspond to phoneme onsets, and the comparison between signals may be more reliable in such instances. Among the candidate microphone clusters 10, the microphone clusters 10 that have the largest power ratios may be identified as the least reverberant signal receiving clusters. The output signal from the best quality microphone cluster 10 at a given time, i.e., the microphone cluster 10 that receives the least reverberant signal at a given time, e.g., the microphone cluster 10 at which the least reverberant signal is measured, may be used as the output of system 100. Alternatively, output signals from several best quality receiving clusters 10 at a given time, i.e., the microphone clusters 10 that receive the least reverberant signals (and/or at which the least reverberant signals are measured) at a given time, may be mixed and a combination of the signals may be outputted as the output of system 100. The output of a certain microphone cluster 10 may be the output of the least reverberant microphone unit 14 in that cluster, i.e., for example, the local maximal power signal, and/or a combination of several outputs of several microphone units 14 in that cluster.

Figure 4:
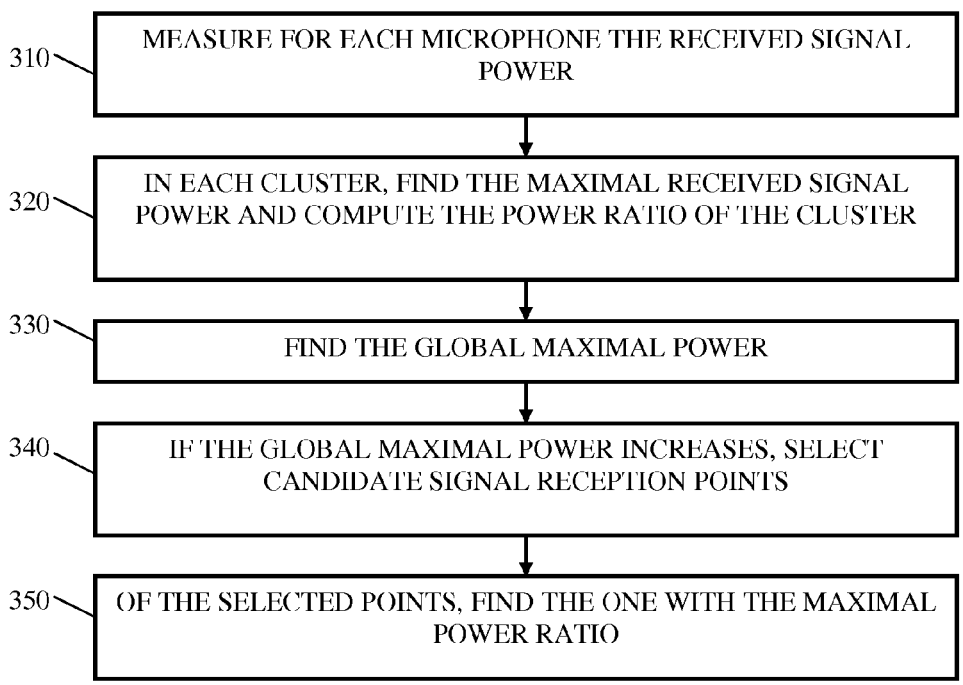
FIG. 4 is a flowchart illustrating a method for real-time monitoring of audio signals reception quality according to embodiments of the present invention.

Reference is now made to FIG. 4, which is a flowchart illustrating a method for real-time monitoring of audio signals reception quality according to embodiments of the present invention. As indicated in block 310, for each microphone unit 14 the received signal power may be found, e.g., measured and/or identified, for example, by main unit 12. As indicated in block 320, in each microphone cluster 10, the microphone with the maximal received signal power may be found, i.e., the local maximal power level at each microphone cluster 10, and the power ratio of the cluster may be computed, as described in detail herein. As indicated in block 330, the global maximal power level may be found, i.e., the highest local maximal power level among microphone clusters 10 distributed in the room. As indicated in block 340, candidate signal reception points, i.e. microphone clusters 10 that have sufficient reception quality level may be selected and/or identified, for example as described in detail herein. Microphone clusters 10 of sufficiently high power level signal reception may be selected as candidate microphone clusters, for example by selecting microphone clusters 10 in which the local maximal power is within a certain predetermined range from the maximal power and/or in any other suitable manner of selection, for example as described in detail above. As described herein, the selection of candidate microphone clusters may be performed if the global maximal power increases, e.g., at instances when the global maximal power level is in upward trend, for example because the power level measurements for evaluation of signal reception quality may be more reliable in these instances.

As discussed in detail above, the best quality and/or least reverberant received signal may be found, according to embodiments of the present invention, by identifying the microphone cluster 10 in which the received signal power level is sufficiently high and the power ratio of the cluster is maximal. Accordingly, as indicated in block 350, of the selected candidate reception points, i.e., candidate microphone clusters, the microphone cluster 10 that has the maximal power ration may be selected and/or identified as the best receiving microphone cluster. As described above, the output signal from the selected best receiving microphone cluster 10, at a given time, may be used as the output of system 100, or output signals from several best-receiving clusters may be mixed and a combination of the signals may be outputted as the output of system 100.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

The invention claimed is:

1. A method for real-time monitoring of audio signal reverberation level, the method comprising:
   receiving output signals from a plurality of microphone clusters, each microphone cluster having at least two microphone units configured to receive audio signals from at least two distinct directions and output corresponding electrical signals;
   measuring power levels of the signal received by each unit of each cluster;
   finding a maximal signal power level received by a first unit of the at least two units of each cluster, and finding a minimal signal power level received by a second unit of the at least two units of each cluster;
   computing a power ratio of each cluster, wherein the power ratio is the ratio between the maximal signal power level received by the first unit and a minimal signal power level received by the second unit; and
   selecting at least one microphone cluster based on a comparison of the power ratios.

2. The method of claim 1, wherein said selecting at least one microphone cluster comprises selecting at least one microphone cluster with the highest power ratio relative to other microphone clusters ratios.

3. The method of claim 2, wherein said selecting at least one microphone cluster comprises selecting from among candidate microphone clusters that were selected according to a maximal received signal power received by a unit in each cluster.

4. The method of claim 3, wherein said selection of candidate microphone clusters comprises:
   finding a microphone cluster with the highest maximal signal power received by a unit of the cluster; and
   selecting as candidate microphone clusters the microphone clusters having a maximal signal power received by a unit of each cluster within a predetermined range relative to the highest maximal received signal power.

5. The method of claim 1, wherein said selecting at least one microphone cluster is performed at a time when a highest maximal signal power received by a unit is in an upward trend.

6. The method of claim 1, wherein said measuring of power levels is performed by sampling and smoothing the power levels over a certain time interval, wherein said time interval is larger when the sampled power level decreases than when the power level increases.

7. The method of claim 1, wherein at least two microphone units in each microphone cluster are aimed in opposite directions.

8. The method of claim 1, wherein each microphone cluster comprises four perpendicular microphone units.

9. A system for real-time monitoring of audio signal reverberation level, the system comprising:
- a plurality of microphone clusters, each microphone cluster having at least two microphone units to receive audio signals from at least two distinct directions and output corresponding electrical signals;
- a main audio unit configured to receive the output signals; and
- a processor configured to:
    - measure power levels of the signals received by each unit of each cluster;
    - find a maximal signal power level received by a first unit of the at least two units of each cluster;
    - find a minimal signal power level received by a second unit of the at least two units of each cluster;
    - compute a power ratio of each cluster, wherein the power ratio is the ratio between the maximal signal power level received by the first unit and a minimal signal power level received by the second unit; and
    - select at least one microphone cluster based on a comparison of the power ratios.

10. The system of claim 9, wherein at least two microphone units in each microphone cluster are aimed in opposite directions.

11. The system of claim 9, wherein each microphone cluster comprises four perpendicular microphone units.

12. The system of claim 9, wherein the main audio unit selects at least one microphone cluster with the highest power ratio relative to other microphone clusters.

13. The system of claim 12, wherein the main audio unit selects at least one microphone cluster from candidate microphone clusters selected according to maximal signal power received by a unit in each cluster.

14. The system of claim 13, wherein the main audio unit:
- finds a microphone cluster with the highest maximal signal power received by a unit of the cluster; and
- selects as candidate microphone clusters the microphone clusters having maximal signal power received by a unit of each cluster within a predetermined range relative to the highest maximal signal power.

15. The system of claim 9, wherein the processor is further configured to select at least one microphone cluster at a time when a highest maximal signal power received by a unit is in an upward trend.

16. The system of claim 9, wherein the main audio unit measures power levels by sampling and smoothing the power levels over a certain time interval, wherein said time interval is larger when the sampled power level decreases than when the power level increases.

* * * * *